United States Patent
Muta et al.

[11] 3,764,643
[45] Oct. 9, 1973

[54] METHOD FOR SINTERING VERY PURE YTTRIA COMPACTS TO TRANSPARENCY

[75] Inventors: Akinori Muta; Yasuo Tsukuda, both of Tokyo, Japan

[73] Assignee: Hitachi, Ltd., Tokyo, Japan

[22] Filed: Nov. 20, 1970

[21] Appl. No.: 91,369

[30] Foreign Application Priority Data
Nov. 21, 1969 Japan.................................. 44/92936

[52] U.S. Cl....................... 264/65, 106/39.5, 264/66
[51] Int. Cl.............................................. C04b 35/50
[58] Field of Search........................ 264/65, 66, 332; 106/39

[56] References Cited
UNITED STATES PATENTS
3,640,887  2/1972  Anderson.............................. 106/39
3,545,987  12/1970  Anderson.............................. 106/39

OTHER PUBLICATIONS
C. E. Curtis, "Properties of Yttrium Oxide Ceramics", Jour. Amer. Cer. Soc., August, 1957, at 274–278
L. A. Brissette et al., "Thermomechanically Deformed Y O ", Jour. Amer. Cer. Soc., March, 1966, at 165–166
J. D. Schieltz et al., "Anomalous Sintering Behavior of Y O ", Jour. Amer. Cer. Soc., August, 1967, at 439–440
L. R. Furlong et al., "Sintering of Yttrium Oxide", Ceramic Bulletin, December, 1966, at 1,051–1,054

*Primary Examiner*—John H. Miller
*Attorney*—Craig, Antonelli & Hill

[57] ABSTRACT

Finely divided Yttria having a purity of at least 99.99 percent is pressed into compacts, sintered in dry hydrogen or a partial vacuum to temperatures in the range of 2,150°–2,330°C, and refired in wet hydrogen at a temperature of from 1,950°–2,300°C to reoxidize any yttria that was reduced to yttrium during sintering. A dense body transparent to visible light is produced. If a transparent article is not desired, the purity can be reduced.

6 Claims, 4 Drawing Figures

METHOD FOR SINTERING VERY PURE YTTRIA COMPACTS TO TRANSPARENCY

BACKGROUND OF THE INVENTION

This invention relates to a method for producing a sintered polycrystalline body of yttrium oxide. More particularly, it relates to a method for producing a transparent highly dense and highly pure sintered polycrystalline body of yttrium oxide.

As is well known in the art, yttrium oxide has a high melting point of 2,410°C. and a high optical transparency. Furthermore, it is chemically quite stable, so that it is widely used in high temperature applications and in the optical or electrical fields, such as, for example, as an I-R window in heat seeking rockets, a transparent window or a host material for a laser.

A large single crystal of yttrium oxide is difficult to obtain, but is only formed in fine grains because of its high melting point. Therefore, the fine grains are sintered in order to obtain a large body or mass. There are, however, a large number of pores included in the respective grains of yttrium oxide, so that it is necessary to remove or eliminate these pores in order to impart a high density to the sintered body thus obtained.

When fine grains are sintered by heating at a high temperature of about 2,000°C., some grains are observed to unite with each other, while others do not. This phenomenon is called a discontinuous grain growth. It has been generally suspected, heretofore, that once the discontinuous grain growth occurred, the grain boundary of the grown grain became large, so that pores included in the respective grains were still captured in the grown grain since the escape paths of the pores were prolonged. Thus, none of the workers in the prior art has reported the successful production of a highly dense, sintered polycrystalline body or mass of yttrium oxide by press molding fine yttrium oxide grains and then heating at 2,000°C. or above.

Several methods have been reported for providing a pore-free sintered polycrystalline body of yttrium oxide. One of these methods comprises mixing fine grains of yttrium oxide with an appropriate additive, such as thorium oxide, and then pressure molding the mixture into a desired shape and thereafter heating the thus-shaped body at a temperature of about 2,000°–2,200°C. in a hydrogen atmosphere or in vacuo. The additive inhibits or suppresses the discontinuous grain growth and, thus, its presence is essential in this method. A product obtained by this method has been called "Yttralox" by the General Electric Company in the U. S. A. (*Chem. and Eng. News*, Oct. 17, 1966, page 38 and *New Scientist*, Dec. 29, 1966, page 727). This Yttralox has a good optical transparency, which is, however, inferior to that of a pure yttrium oxide sintered body. This method is further defective in that the product obtained thereby has a poor corrosion resistivity against sodium vapor, since it contains thorium oxide in an amount of 10 mol percent with respect to the yttrium oxide and since it requires a uniform mixing of the thorium oxide with the yttrium oxide which is quite difficult and troublesome to carry out effectively in practice.

Another method reported in the prior art involves mixing fine yttrium oxide grains with an additive capable of inhibiting the discontinuous grain growth, such as lithium fluoride, and then pressure molding the mixture into a desired shape and simultaneously heating it at a high temperature. This method is called a hot press method. A product obtained by this method has been reported by R. A. Lefever et al. in *Material Research Bulletin*, Vol. 2, 1967, pages 865–869. In accordance with this method, the sintering is carried out at a temperature of approximately 950°C. for about 48 hours under pressure of 10,000–12,000 psi. The product obtained by this method has a good optical transparency, but this method has the disadvantage that it requires a large scale processing facility operative at a high temperature. Furthermore, it is unsuitable for mass production because of its low working efficiency and, moreover, it is not suitable for forming complex shape bodies.

As can be seen from the above discussion, both of these prior art methods require at least some additive, which is itself a drawback and a disadvantage.

SUMMARY OF THE INVENTION

One of the principal objects of the present invention is to provide a simple method for producing a sintered polycrystalline body of yttrium oxide having a high density of no less than 98 percent of the theoretical density thereof.

Another object of the invention is to provide a method for producing a highly pure and highly dense sintered polycrystalline body of yttrium oxide having a high density and a good transparency.

A further object of the invention is to provide a highly dense and pure sintered polycrystalline body or mass of yttrium oxide.

These and other objects and advantages of the present invention will become apparent to those skilled in the art from a consideration of the following specification and claims, taken in conjunction with the accompanying drawings.

The present invention is fundamentally established on the basis of the finding that the removal of the pores from yttrium oxide grains is rapidly facilitated when a molded body of yttrium oxide grains is heat-sintered in hydrogen or under a vacuum at a temperature of from 2,150° to 2,330°C., particularly from 2,220° to 2,270°C. The reason why the removal of pores is facilitated in this manner is not fully understood, but the following expository assumption is made in order to provide further background information, although the present invention is, of course, not to be limited to the veracity of any theoretical explanation. When a high temperature heat of over 2,000°C. is applied to a molded body of yttrium oxide, the grain growth is enormously facilitated. Moreover, the movement and diffusion of constituent atoms is extremely facilitated, so that the grain boundaries come into touch with the pores. This allows a quick escape of the pores, providing the resulting advantages of the present invention.

In accordance with this invention, the sintering should be carried out either in a hydrogen atmosphere or under a vacuum of $10^{-2}$ mm Hg or less. In order to provide a high density in the resulting product, the sintering should be carried out in a thoroughly dry hydrogen atmosphere having a dew point not higher than about −20°C. or in a vacuum atmosphere of about $10^{-4}$ mm Hg.

The product obtained under the above conditions is colored from deep brown to black and has a high in-line transmission for from infra-red to far infra-red rays. If decolorization is required, the product should be refired at a temperature that is the same as or slightly lower than the sintering temperature in a slightly wet hydrogen atmosphere having a dew point of not lower than −20°C., preferably from 0°C. to room temperature (about 20°C.). The decolored product has a high in-line transmission for a wide range spectrum from visible rays to far infra-red rays. Both the colored and decolored products have substantially no pores therein and a high density which is substantially equal to the theoretical density of yttrium oxide.

As for a reason why the sintered yttrium oxide body is colored, it seems to be caused by the introduction of oxygen-wanting defects in the yttrium oxide grains of the sintered body. The introduction of pores is caused by effecting the sintering in such an intense oxygen-deficient atmosphere as mentioned above. Once such defects are introduced into the body, the pores in the respective grains are entirely removed since they diffuse through the defects, thus resulting in the obtention of a high density.

The in-line transmission is defined as the ratio of the amount of radiant energy of vertically projected input rays onto a flat planar surface of the sample body to the amount of radiant energy of output rays derived along the extension path of the input rays. The value of the in-line transmission represents an average value of transmissivity over a wavelength range of from 0.32 to 1.1 $\mu$ through a sample body of 0.76 mm. in thickness and is given in the units of percent.

The theoretical density ratio is defined as the ratio of the theoretically calculated density of yttrium oxide ($Y_2O_3$) to the actual density of the sintered body or mass and is given in the units of percent.

DETAILED DESCRIPTION OF THE PREFERRED EMBODIMENTS

Figure 1:
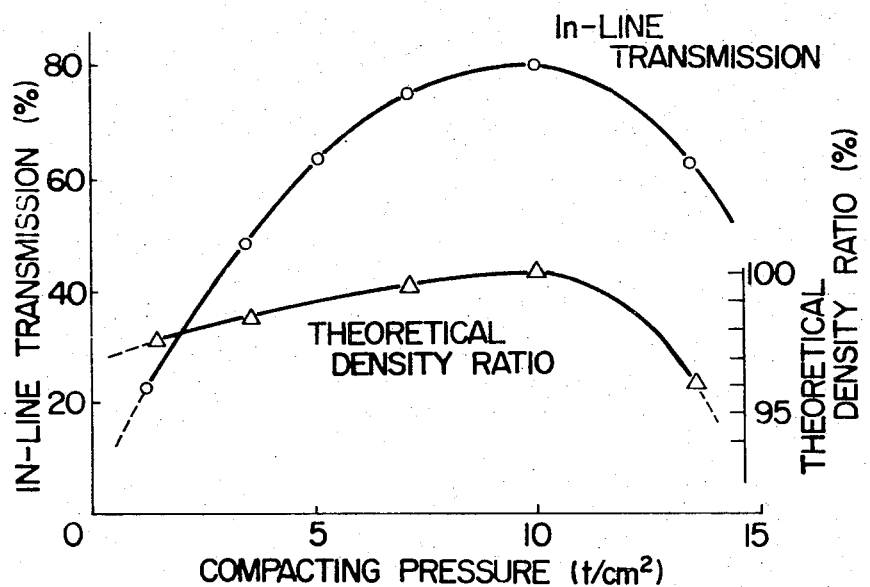
FIG. 1 is a graph showing the relationship between the in-line transmission as well as the density of the sintered body and the compacting molding pressure for forming a molded body.

As discussed hereinabove, the method of the present invention is characterized by the steps of preparing highly pure fine grains of yttrium oxide, press molding the grains into a desired shape and sintering the resultant molded body or mass at an extremely high temperature above 2,000°C.

Raw yttrium oxide grains employed in the present invention are preferably as pure and fine as possible. However, a small amount of impurities can be contained in the raw grains. Where it is desired to obtain a highly dense sintered body, the raw yttrium oxide grains may contain an impurity of 0.1 weight percent or less, but where it is desired to obtain a sintered body having a high transparency for visible rays, an impurity amount of not more than 0.01 weight percent is all that can be permitted and, moreover, elements such as terbium and molybdenum should not be contained in the grains for preventing the sintered body from being colored.

In accordance with the present invention, yttrium oxide having a particle size of not larger than 30 $\mu$, preferably from 0.4 to 10 $\mu$, may be employed.

The compacting molding pressure is preferably not lower than 1 ton/cm² for the reason that the sintered body does not attain a satisfactorily high density when the compacting molding pressure is lower than this lower limit value. If the press molding is carried out under a compacting pressure of not lower than 5 ton/cm², a certain amount of air is observed to be enclosed among the grains of the molded body. Accordingly, it is desirable to remove a major amount of air from a molded body by pre-heating the body, this pre-heating being designated as a degassing treatment. Ordinarily, the degassing treatment is carried out by heating the molded body in a vacuum atmosphere of $10^{-2}$ to $10^{-3}$ mm Hg at a temperature of about 100° to 250°C. for a period of 10 to 60 minutes.

In the case of molding under the application of about 5 ton/cm², the degassing treatment is preferably carried out by heating the molded body under a vacuum atmosphere of about $10^{-2}$ mm Hg at a temperature of about 100° to 150°C. for a period of 10 to 60 minutes. In the case of molding under an application of about 10 to 15 ton/cm², the degassing treatment is preferably carried out by heating the molded body at a temperature of 200° to 250°C. for a period of 10 to 60 minutes under a vacuum of about $10^{-3}$ mm Hg.

According to one of the preferred embodiments of the present invention, yttrium oxide grains having a purity of 99.99 percent and an average particle size of about 4 $\mu$ are press molded into a disc-like shape under various pressures ranging from 1 to 13.5 ton/cm². The sample discs thus molded under different pressures of more than 5 ton/cm² are degassed in a vacuum atmosphere of $10^{-2}$ mm Hg for 60 minutes at 200°C. The sample discs are then heated in a hydrogen atmosphere having a dew point of about −36°C. for 60 minutes at a temperature of 2,220°C.

After the sintering has been completed, refiring is effected in a hydrogen atmosphere having a dew point of 20°C. for 10 minutes at 1,950°C. and, thereafter, the sample discs are cooled to room temperature (about 20°C.). The thus-produced sintered bodies are then polished on the opposite surfaces thereof to give a final thickness of 0.76 mm., and then the bodies are subjected to optical measurements.

FIG. 1 shows the density and optical transparency of each of the resulting products. As can be clearly seen from FIG. 1, in this embodiment, a high transparency of more than 60 percent is obtained from the sintered body which is molded with a compacting pressure of 5 to 13.5 ton/cm², and a high density of more than 98 percent is obtained from the sintered body which is molded with a pressure of 3 to 12 ton/cm². The maximum values in density and in transparency are obtainable when the molding is carried out under a pressure of about 10 ton/cm².

Table 1 shows the densities and transparencies of different samples prepared under different molding pressures over 15 ton/cm². The other preparatory conditions are the same as discussed in connection with the preferred embodiments hereinabove.

TABLE 1

| Compacting pressure (ton/cm$^2$) | 15 | 20 | 25 | 30 |
|---|---|---|---|---|
| In-line transmission (%) | 50 | 37 | 31 | 26 |
| Theoretical density ratio (%) | 94.2 | 93.6 | 93.4 | 93.4 |

From Table 1, it can be seen that when the compacting pressure exceeds 30 ton/cm$^2$, the density and in-line transmission of the obtained sintered body become relatively low values. Thus, the effective compacting pressure range in accordance with the objectives of the invention is from 1 to 30 ton/cm$^2$, and more preferably from 5 to 13 ton/cm$^2$.

Figure 2:
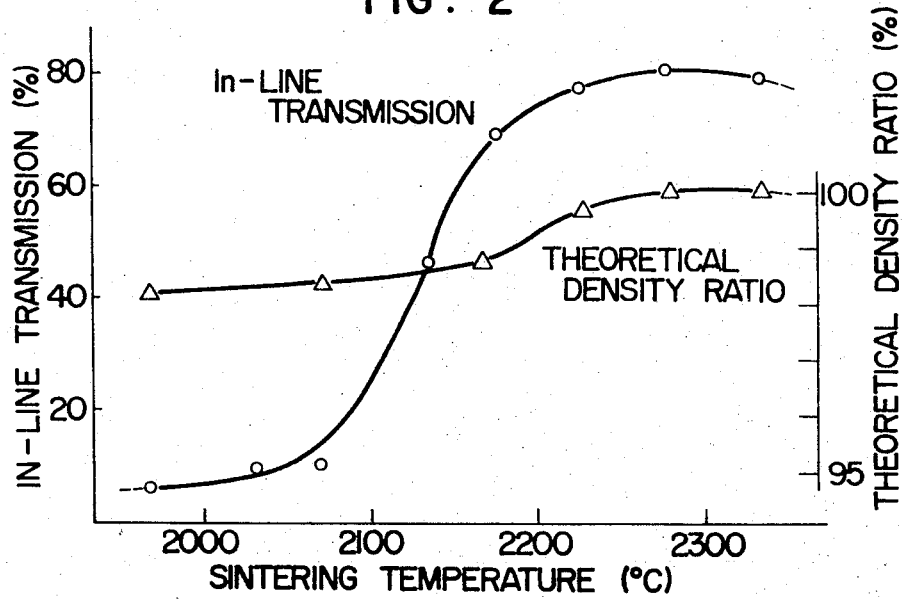
FIG. 2 is a graph showing the relationship between the in-line transmission as well as the density of the sintered body and the sintering temperature.

FIG. 2 shows how the heating temperature difference affects the properties of the resultant products which are prepared by press molding yttrium oxide grains having a purity of 99.99 percent and an average grain size of 4 $\mu$ with 10 ton/cm$^2$ pressure, degassing at 150°C. in a hydrogen atmosphere of 10$^{-2}$ mm Hg for 60 minutes and, thereafter, heat sintering at various temperatures in a hydrogen atmosphere having a dew point of $-36$°C. for 60 minutes. All of the samples are subjected to a decoloring treatment in such a manner that they are heated at 1,950°C. in a hydrogen atmosphere having a dew point of 20°C. for 10 minutes.

It can be observed from FIG. 2 that when sintering is effected at a temperature of more than 2,000°C., the sintered body can have a theoretical density ratio of more than 98 percent, and that when the sintering temperature exceeds 2,150°C., a high in-line transmission over 60 percent can be obtained. If a high density of over 99 percent and a high in-line transmission of over 70 percent are required in a particular application, a heat sintering temperature range of from about 2,180° to about 2,330°C., preferably from 2,200° to 2,300°C., is effective in attaining this objective.

Figure 3:
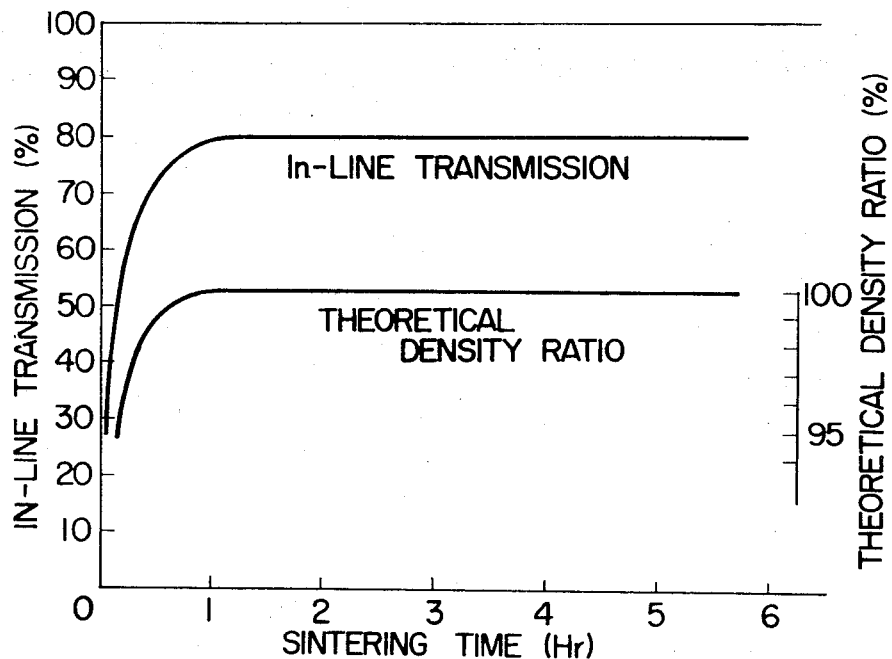
FIG. 3 is a graph showing the relationship between the in-line transmission as well as the density of the sintered body and the sintering period of time which is defined as the soaking time.

FIG. 3 shows the effects of the sintering time period on the properties of the sintered bodies. The samples are prepared in the same manner and under the same conditions as those in connection with FIG. 2, by fixing the heat sintering temperature to 2,220°C. From FIG. 3, it can be seen that a sintering period of time of more than 60 minutes is sufficient to obtain very good properties in the resultant molded bodies.

Figure 4:
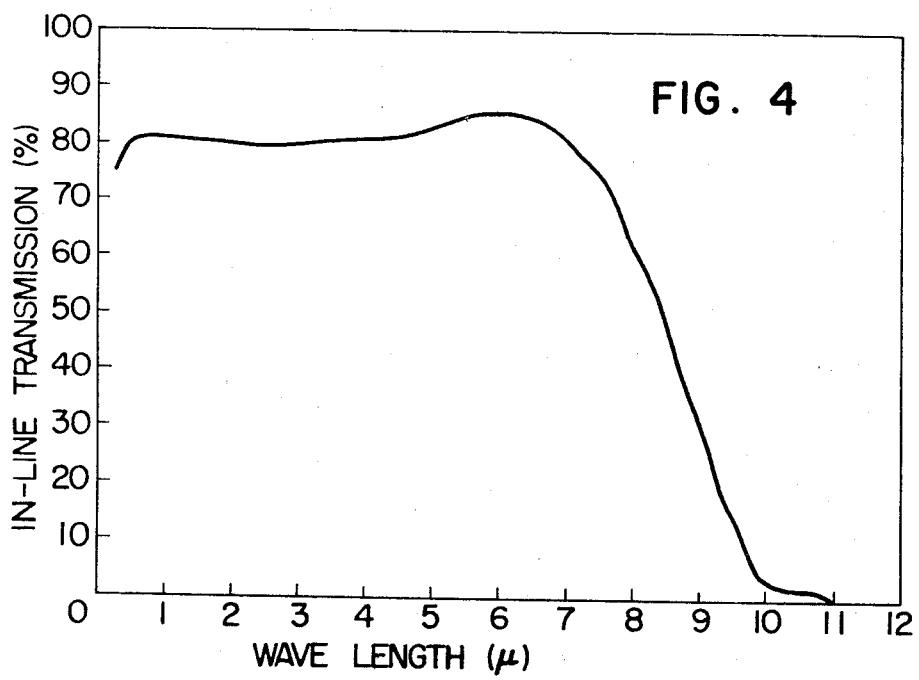
FIG. 4 is a graph showing the in-line transmissivity of a yttrium oxide sintered body obtained in accordance with the present invention with respect to input rays of various wavelengths.

FIG. 4 shows an optical transparency characteristic curve of a yttrium oxide sintered body prepared by press molding yttrium oxide grains having a purity of 99.99 percent and an average grain size of 4 $\mu$ under a pressure of 10 ton/cm$^2$, degassing the molded body in a vacuum of 10$^{-3}$ mm Hg at 150°C. for 60 minutes, heating the thus-degassed body in a hydrogen atmosphere having a dew point of about $-36$°C. for 60 minutes at a temperature of 2,270°C. in order to sinter the same, and refiring the thus-sintered body in a hydrogen atmosphere having a dew point of 0°C. for 60 minutes at a temperature of 1,900°C. as a decoloring treatment, and, thereafter, cooling the body to room temperature. As can be seen from FIG. 4, the in-line transmission of the final product is more than 80 percent with rays having a wavelength in the range between 0.3 to 7 $\mu$.

The degassing treatment described above should be employed where the molding pressure exceeds 5 ton/cm$^2$ if high density products products are required. The degassing temperature preferably ranges from 100° to 210°C., and a degassing vacuum atmosphere of from 10$^{-2}$ to 10$^{-5}$ mm Hg is quite suitable. Degassing is effected for a time period of 60 minutes or more.

As discussed above, the sintering may be carried out under a hydrogen atmosphere, but a vacuum atmosphere of 10$^{-2}$ mm Hg or lower is quite suitable and applicable in the present invention.

The refiring temperature should be selected so as to be substantially equal to the sintering temperature or relatively lower, for example, from 1,950° to 2,300°C.

The invention being thus described, it will be obvious that the same may be varied in many ways. Such variations are not to be regarded as a departure from the spirit and scope of the invention, and all such modifications as would be obvious to one skilled in the art are intended to be included herein.

We claim:

1. A method for providing a transparent highly pure and highly dense sintered polycrystalline body consisting of yttrium oxide having a density of at least 98 percent of the theoretical density thereof and a high in-line transmission for a wide range spectrum from visible to far infrared rays comprising the steps of:
   1. press molding fine grains of highly pure yttrium oxide having a purity of at least 99.99 percent and an average particle size of from 0.4 to 10 $\mu$ with a compacting molding pressure of 3 to 12 ton/cm$^2$ to form a molded body of desired shape; and
   2. treating said molded body to form said transparent polycrystalline body by the steps which consist of:
      a. heating the molded body in a non-oxidizing thoroughly dry atmosphere selected from the group consisting of hydrogen and vacuum at a temperature of about 2,150° to 2,330°C. for at least about 30 minutes to effect sintering thereof; and
      b. refiring the resultant sintered body in a hydrogen atmosphere having a dew point of higher than 0°C. at a temperature of from 1,950° to 2,300°C. for a period of time not less than several minutes to effect decoloring of said sintered body.

2. A method according to claim 1, wherein the heating step is carried out in a hydrogen atmosphere having a dew point of not higher than $-20$°C. at a temperature of from 2,200° to 2,300°C. for a period of time of not less than 60 minutes.

3. A method according to claim 1, wherein the heating step is carried out under the vacuum of at least 10$^{-2}$ mm Hg.

4. A method according to claim 3, wherein the vacuum is about 10$^{-4}$ mm Hg.

5. A method according to claim 1, further comprising the step of retaining the molded body, before the heat sintering step, in a vacuum of not higher than 10$^{-2}$ mm Hg at a temperature of from 100° to 250°C. for at least 10 minutes.

6. A method according to claim 5, wherein the molded body is retained in said vacuum for about 10 to 60 minutes.

* * * * *